UNITED STATES PATENT OFFICE.

WALTER S. WILKINSON, OF BALTIMORE, MARYLAND.

MANUFACTURE OF BITUMINOUS PAVING.

SPECIFICATION forming part of Letters Patent No. 705,728, dated July 29, 1902.

Application filed December 31, 1901. Serial No. 87,930. (No specimens.)

*To all whom it may concern:*

Be it known that I, WALTER S. WILKINSON, a citizen of the United States, residing at Baltimore, in the State of Maryland, have invented an Improvement in the Manufacture of Bituminous Paving, of which the following is a specification.

Bituminous paving or pavement mixtures or compositions ordinarily consist mainly of crushed and partly-pulverized stone or sand, very finely-comminuted stony material called "dust" or "fines," the whole of the foregoing being commonly known as "body material," and a cementing or binding agent commonly termed "bituminous cement." This cement has been usually an asphaltic cement containing, say, from ten to twenty per cent. of residuum of petroleum or other flux mixed with the asphalt while heated. When the mixture or composition is to be compressed in molds into blocks or tiles, the body material is usually crushed and partly-pulverized stone. When it is to be laid and rolled or tamped in the form of sheet-pavement, the body material is usually sand and dust or fines; but whether compressed in molds into blocks or tiles or laid and rolled or tamped in sheet form the durability of the resultant pavement depends largely upon the thoroughness and uniformity of mixture of the various elements composing the mixture or composition. For instance, the body material is ordinarily relied upon to furnish the principal resistance to the wear and tear of traffic, the fines are used to fill in the voids between the coarser particles of body material, and the cement is intended to serve merely as a binding agent between the various particles of stony material.

It is desirable that the voids between the coarsest particles of body material be filled by the next smaller particles, and the voids then remaining filled by the next smaller particles, and so on, down to the smallest voids, and these in turn filled with the fines, the cement serving merely as a coating to bind or unite every part of the surface of each stony particle to the surfaces of the next adjacent stony particles. In fact, the presence of voids filled with free cement constitutes an element of weakness in any bituminous pavement; hence the necessity for the finest possible fines, preferably even an impalpable powder, and the necessity, also, for a method of handling the materials that will insure the most thorough and uniform mixing of the body material in order to reduce the possibility of any voids remaining to be filled with free cement. Obviously there is the equal necessity for such a method of handling or treating the materials as will insure the most complete coating of each and every particle of stony material with a thin film or coating of the binding agent or cement.

Prior to my invention in the actual commercial manufacture of bituminous paving or pavement mixtures or compositions it has been customary to prepare the cement, usually an asphaltic cement, in a vessel or tank and to dry-mix in a usual pug-mill all the body material, including the fines. Then and while the dry-mixed body material was being agitated in the pug-mill the cement was added thereto by pouring it gradually into the agitated mass, the whole being mixed by continued operation of the pug-mill. Asphalt being the most costly of all the ingredients or elements employed in compositions of this character, it is desirable to reduce the quantity of asphalt or asphaltic cement required for the production of a given quantity of suitable asphaltic paving or pavement mixture or composition as much as possible without deterioration of the quality of said mixture or composition. This can best be done by rendering more complete the uniform distribution of fines throughout the mass and the more complete coating of each and every particle of such fines with the cement in order that each of such particles may better fulfil its function of "filling a void," leaving the cement merely as a surface coating therefor.

While I have found in the course of my experiments that it is desirable to first mix while dry or dry-mix the bulk of the body material before the cement is added thereto, I have discovered that the resultant mixture or composition is improved by impregnating the cement with as much of the fines as may be added thereto while still preserving the necessary liquidity of the cement before the cement is added to the remaining body material. In this way I insure the thorough coating with cement of each and every particle of the fines, however small, and which it would be impossible to obtain if the said said fines were first dry-mixed with the remaining body material. I have found that a large percentage of the fines which it is desired to use in the mixture or composition may be thus incorporated into the cement, while still preserving that liquidity which is necessary to enable the cement to permeate freely the mass of remaining body material. Having by this impregnation of the cement with fines obtained the most thorough possible incorporation or mixture of such fines and the cement, this fines-impregnated cement is then brought into contact with the remaining body material and thoroughly mixed therewith. This is ordinarily best done by agitating such remaining body material in a pug-mill and while in a state of agitation adding, preferably gradually, thereto the fines-impregnated cement, the agitation producing a thorough and complete mixture of said body material and the fines-impregnated cement, and the cement being already thoroughly impregnated with the fines and in a liquid condition notwithstanding the fines it contains serves as a vehicle to carry the coated fines into and to fill all the voids in the mass. Nor is there danger of any material voids being filled with free cement because of the fines carried in and by the liquid cement. I have found also that by thus obtaining a more thorough filling of the voids with the coated fines a given quantity of asphalt is sufficient for and will produce a larger quantity of paving or pavement mixture or composition than has heretofore been possible, the increase or gain with Trinidad asphalt amounting to about six per cent. or more. With other and purer asphalts or cement containing a larger percentage of flux—flux being practically pure bitumen—the gain is proportionately greater, because the more pure bitumen there is in the cement the more fines may be incorporated therein. The quality of the pavement produced, whether of block or sheet form, is also greatly improved, because the mixing or incorporation of the materials is more perfect in that the cement is used only as a binder, the voids being filled with stony materials.

To illustrate the practice of my invention, what is known as "Trinidad asphalt," most commonly used in the United States for pavement purposes, when dried or refined, so as to be usable for pavement compositions, ordinarily contains naturally from forty-four to forty-six per cent., more or less, of finely-comminuted earthy matter or fines—such as alumina and silicate of alumina—and asphaltic cement made therefrom for making asphalt blocks and tiles usually contains about eighty-nine per cent., more or less, of this dried or refined asphalt and about eleven per cent. of residuum of petroleum. For sheet-pavements the cement usually contains about eighty-five per cent. of asphalt and about fifteen per cent. of residuum. When asphaltic paving-cement is made from asphalts which are nearly pure bitumen—such as Bermudez, Alcatrez, &c.—a larger percentage of flux is added, because there is nearly double the percentage of bitumen in a given quantity as compared with Trinidad asphalt. While this asphaltic cement is heated to about 320° Fahrenheit, I add, in accordance with my discovery, a suitable quantity of dust or finely-comminuted limestone or other earthy matter—such as brick dust, ground sand, cement, or other fines—but preferably specially-prepared calcareous material reduced as nearly as possible to the condition of an impalpable powder.

When the asphaltic cement is composed of about eighty-nine per cent. of dried Trinidad asphalt and about eleven per cent. of residuum of petroleum or equivalent percentage of other flux, I add the dust or fines to the cement, preferably while the latter is in a molten condition and under agitation, in the proportion, say, of about thirty-five pounds of the fines to about one hundred pounds of the asphaltic cement and mix and incorporate the same thoroughly and evenly throughout the cement. This may be done by mechanical means or by the use of jets of air or steam projected into the mass.

If an asphalt containing a much larger percentage of bitumen than Trinidad is used, a much larger percentage of dust or fines can be added to the cement and incorporated in and with it.

Having heated the body material other than the fines contained in the cement and placed such other or remaining body material in a usual pug-mill or mixer and dry-mixed the same, if necessary, then and while said body material is still hot and agitated by the rapidly-moving blades of the mixer I take the hot asphaltic fines-impregnated cement and bring it, as by pouring, gradually into contact with the agitated hot body material in the mixer and rapidly and thoroughly mix the same therewith. The resultant mixture or composition is then ready for compression for use. If for blocks or tiles, it is compressed under heavy pressure in a mold, and the resultant compressed body is quickly cooled in flowing water or otherwise to set it exteriorly to preserve its shape. The compression thoroughly compacts the mass throughout which the fines-impregnated cement is distributed, thus insuring the most advantageous results therefrom, and the quick cooling exteriorly of the compressed mass or body prevents distortion and relaxation or recovery thereof by and during the necessarily slower cooling of the interior portion of the mass. Both these steps are desirable for obtaining the best results from my invention when applied to the manufacture of blocks, tiles, and the like. If for sheet-pavements, said mixture or composition is laid while hot and is tamped or rolled upon the roadway.

When the amount of fines that may be found with the body material, together with the fines it is possible to add to the cement and still preserve its necessary liquidity, does not equal the whole amount of fines desired in the mixture or composition, any additional fines may be added to and dry-mixed with the body materials, as heretofore.

I have found ordinarily that in paving mixtures where the body material is crushed non-calcerous stone from twelve per cent. to fifteen per cent. of fines-impregnated asphaltic (Trinidad) cement and about eighty-eight to eighty-five per cent. of remaining body material produce excellent results; but these proportions will vary more or less, according to the materials used and the conditions under which they are used.

When the body material is mainly or largely of sand, the percentage of fines-impregnated asphaltic (Trinidad) cement may range from fifteen to twenty-five per cent., more or less, to eighty-five to seventy-five per cent. of remaining body material; but the proportions here also would vary under varying conditions, as above stated. In all cases, however, the incorporation of fines first with the asphaltic or bituminous cement produces such increased thoroughness and evenness of mixture of the fines with the cement and subsequently with the remaining body material that the resultant paving or pavement mixture or composition while increased in quantity is also of a quality and durability superior to anything ever heretofore obtained for paving purposes.

Having described my invention and without limiting myself to unessential details, what I claim, and desire to secure by Letters Patent, is—

1. That improvement in the manufacture of bituminous paving or pavement mixtures or compositions which consists in first producing a fines-impregnated cement by mixing bituminous cement and fines; dry-mixing by agitating the remaining body material, and then, while the latter is in agitation, mixing therewith said fines-impregnated cement.

2. That improvement in the manufacture of bituminous paving or pavement mixtures or composition which consists in impregnating the bituminous cement with as much of the fines as may be added thereto while still preserving the necessary liquidity of the cement, agitating the remaining body material, and, while the latter is in agitation, mixing therewith said fines-impregnated cement.

3. That improvement in the manufacture of bituminous pavements which consists in producing a fines-impregnated cement consisting of bituminous cement fixed with fines, agitating the remaining body material, and, while in agitation, mixing therewith the fines-impregnated cement, subjecting the resultant mixture to heavy compression in a mold and subjecting the compressed body to the action of a cooling agent, to set it to preserve its shape.

In testimony whereof I have signed my name to this specification in the presence of two subscribing witnesses.

WALTER S. WILKINSON.

Witnesses:
 L. RABILLON,
 JAMES E. TROTT.